United States Patent
Liu et al.

(10) Patent No.: US 11,856,585 B2
(45) Date of Patent: Dec. 26, 2023

(54) CHANNEL STATE INFORMATION (CSI) REPORTING FOR MULTICAST COMMUNICATIONS

(71) Applicant: QUALCOMM Incorporated, San Diego, CA (US)

(72) Inventors: Le Liu, Fremont, CA (US); Kazuki Takeda, Tokyo (JP); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 17/395,158

(22) Filed: Aug. 5, 2021

(65) Prior Publication Data
US 2022/0046697 A1 Feb. 10, 2022

Related U.S. Application Data

(60) Provisional application No. 63/062,283, filed on Aug. 6, 2020.

(51) Int. Cl.
| | |
|---|---|
| *H04W 72/14* | (2009.01) |
| *H04W 72/23* | (2023.01) |
| *H04W 72/1268* | (2023.01) |
| *H04W 24/10* | (2009.01) |
| *H04W 72/30* | (2023.01) |
| *H04W 72/54* | (2023.01) |

(52) U.S. Cl.
CPC ........... *H04W 72/23* (2023.01); *H04W 24/10* (2013.01); *H04W 72/1268* (2013.01); *H04W 72/30* (2023.01); *H04W 72/54* (2023.01)

(58) Field of Classification Search
CPC .............. H04W 72/14; H04W 72/005; H04W 72/1268; H04W 24/10; H04W 72/1226
See application file for complete search history.

(56) References Cited

U.S. PATENT DOCUMENTS

| | | | |
|---|---|---|---|
| 9,345,044 B2 * | 5/2016 | Tang ..................... | H04W 48/12 |
| 9,467,819 B2 * | 10/2016 | Niu ........................ | H04L 5/0055 |
| 10,389,505 B2 * | 8/2019 | Lee ........................ | H04W 72/04 |
| 2009/0323577 A1 * | 12/2009 | Agrawal ............... | H04L 1/1887 |
| | | | 370/312 |
| 2014/0003319 A1 * | 1/2014 | Etemad ................. | H04W 72/30 |
| | | | 370/312 |
| 2014/0219151 A1 * | 8/2014 | Damji ............... | H04W 52/0235 |
| | | | 370/311 |

(Continued)

FOREIGN PATENT DOCUMENTS

WO WO-2018218393 A1 * 12/2018

*Primary Examiner* — Parth Patel
(74) *Attorney, Agent, or Firm* — Qualcomm Incorporated/Seyfarth Shaw LLP

(57) ABSTRACT

A method of wireless communication performed by a user equipment (UE) includes receiving, from a base station, a message comprising a multicast downlink grant for a downlink channel associated with a multicast transmission. The method also includes receiving, from the base station, a reference signal associated with the downlink channel. The method further includes transmitting, to the base station, a unicast message comprising a measurement report indicating a measurement of the reference signal associated with the downlink channel. The reference signal may be measured based on receiving the multicast downlink grant.

30 Claims, 8 Drawing Sheets

(56) References Cited

U.S. PATENT DOCUMENTS

| | | | | |
|---|---|---|---|---|
| 2017/0041120 A1* | 2/2017 | Wei | .................. | H04L 5/0057 |
| 2017/0111094 A1* | 4/2017 | Sartori | .................. | H04B 7/0695 |
| 2018/0270705 A1* | 9/2018 | Sun | .................. | H04L 1/1607 |
| 2019/0140723 A1* | 5/2019 | Yum | .................. | H04B 7/0417 |
| 2019/0174466 A1* | 6/2019 | Zhang | .................. | H04L 5/005 |
| 2019/0190673 A1* | 6/2019 | Kwak | .................. | H04L 27/26 |
| 2020/0162134 A1* | 5/2020 | Kakishima | .................. | H04W 72/04 |
| 2020/0177253 A1* | 6/2020 | Wu | .................. | H04W 72/1268 |
| 2020/0177254 A1* | 6/2020 | Lee | .................. | H04W 56/0045 |
| 2020/0304272 A1* | 9/2020 | Lee | .................. | H04L 5/0064 |
| 2021/0084600 A1* | 3/2021 | Ahn | .................. | H04L 5/0087 |
| 2021/0168570 A1* | 6/2021 | Navratil | .................. | H04W 72/005 |
| 2021/0168783 A1* | 6/2021 | Islam | .................. | H04W 72/042 |
| 2021/0226684 A1* | 7/2021 | Koskela | .................. | H04W 76/18 |
| 2021/0288705 A1* | 9/2021 | Lee | .................. | H04B 7/0643 |
| 2021/0378053 A1* | 12/2021 | Saily | .................. | H04W 4/06 |
| 2021/0385842 A1* | 12/2021 | Zhao | .................. | H04L 5/0055 |
| 2021/0400567 A1* | 12/2021 | Sha | .................. | H04W 48/16 |
| 2022/0039138 A1* | 2/2022 | Takeda | .................. | H04L 5/0053 |
| 2022/0046697 A1* | 2/2022 | Liu | .................. | H04W 24/10 |
| 2022/0110092 A1* | 4/2022 | Sun | .................. | H04W 72/1289 |
| 2022/0159683 A1* | 5/2022 | Islam | .................. | H04W 72/042 |
| 2022/0167245 A1* | 5/2022 | Pilz | .................. | H04W 4/08 |
| 2022/0182943 A1* | 6/2022 | Maleki | .................. | H04W 68/025 |
| 2022/0225290 A1* | 7/2022 | Ganesan | .................. | H04L 5/0057 |
| 2022/0303781 A1* | 9/2022 | Ye | .................. | H04W 74/0808 |
| 2022/0394616 A1* | 12/2022 | Maleki | .................. | H04W 52/0229 |

\* cited by examiner

1

CHANNEL STATE INFORMATION (CSI) REPORTING FOR MULTICAST COMMUNICATIONS

CROSS-REFERENCE TO RELATED APPLICATION

The present application claims the benefit of U.S. Provisional Patent Application No. 63/062,283, filed on Aug. 6, 2020, and titled "CHANNEL STATE INFORMATION (CSI) REPORTING FOR NEW RADIO (NR) MULTICAST," the disclosure of which is expressly incorporated by reference in its entirety.

FIELD OF THE DISCLOSURE

Aspects of the present disclosure generally relate to wireless communications, and more particularly to techniques and apparatuses for channel state information (CSI) reporting for 5G new radio (NR) multicast.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (for example, bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation.

In some wireless networks, a base station may dynamically schedule a group of UEs based on channel state information (CSI). In some examples, one or more UEs in a group of UEs may report the CSI based on one or more channel measurements performed by each UE of the one or more UEs. In some such wireless networks, the base station may transmit an uplink grant to trigger a channel measurement, such as an aperiodic CSI reference signal (RS) (A-CSI-RS) measurement. The uplink grant may also request the UE to transmit a channel measurement report, such as an A-CSI measurement report via an uplink shared channel (for example, a physical uplink shared channel (PUSCH)). In such wireless networks, the base station may transmit a different uplink grant to each UE of the group of UEs to trigger a channel measurement and to schedule a channel measurement report for a multicast transmission to the group of UEs.

SUMMARY

In one aspect of the present disclosure, a method for wireless communication by a user equipment (UE) is disclosed. The method includes receiving, from a base station, a message comprising a multicast downlink grant for a downlink channel associated with a multicast transmission. The method also includes receiving, from the base station, a reference signal associated with the downlink channel. The method further includes transmitting, to the base station, a unicast message comprising a measurement report indicating a measurement of the reference signal associated with the downlink channel. In some examples, the reference signal may be measured based on receiving the multicast downlink grant.

Another aspect of the present disclosure is directed to an apparatus for wireless communication at a UE. The apparatus includes means for receiving, from a base station, a message comprising a multicast downlink grant for a downlink channel associated with a multicast transmission. The apparatus further includes means for receiving, from the base station, a reference signal associated with the downlink channel. The apparatus still further includes means for transmitting, to the base station, a unicast message comprising a measurement report indicating a measurement of the reference signal associated with the downlink channel. In some examples, the reference signal may be measured based on receiving the multicast downlink grant.

In another aspect of the present disclosure, a non-transitory computer-readable medium with non-transitory program code recorded thereon for wireless communication at a UE is disclosed. The program code is executed by a processor and includes program code to receive, from a base station, a message comprising a multicast downlink grant for a downlink channel associated with a multicast transmission. The program code further includes program code to receive, from the base station, a reference signal associated with the downlink channel. The program code still further includes program code to transmit, to the base station, a unicast message comprising a measurement report indicating a measurement of the reference signal associated with the downlink channel. In some examples, the reference signal may be measured based on receiving the multicast downlink grant.

Another aspect of the present disclosure is directed to an apparatus for wireless communication at a UE. The apparatus includes a processor, a memory coupled with the processor, and instructions stored in the memory and operable, when executed by the processor, to cause the apparatus to receive, from a base station, a message comprising a multicast downlink grant for a downlink channel associated with a multicast transmission. Execution of the instructions further cause the apparatus to receive, from the base station, a reference signal associated with the downlink channel. Execution of the instructions also cause the apparatus to transmit, to the base station, a unicast message comprising a measurement report indicating a measurement of the reference signal associated with the downlink channel. In some examples, the reference signal may be measured based on receiving the multicast downlink grant.

In one aspect of the present disclosure, a method for wireless communication by a base station is disclosed. The method includes transmitting, to a UE, a message comprising a multicast downlink grant for a downlink channel associated with a multicast transmission. The method further includes transmitting, to the UE, a reference signal associated with the downlink channel. The reference signal may be transmitted based on transmitting the message comprising the multicast downlink grant. The method still further includes receiving, from the UE, a unicast message comprising a measurement report indicating a measurement of the reference signal.

Another aspect of the present disclosure is directed to an apparatus for wireless communication at a base station. The apparatus includes means for transmitting, to a UE, a message comprising a multicast downlink grant for a downlink channel associated with a multicast transmission. The apparatus further includes means for transmitting, to the UE, a reference signal associated with the downlink channel. The reference signal may be transmitted based on transmitting the message comprising the multicast downlink grant. The apparatus still further includes means for receiving, from the UE, a unicast message comprising a measurement report indicating a measurement of the reference signal.

In another aspect of the present disclosure, a non-transitory computer-readable medium with non-transitory program code recorded thereon for wireless communication at a base station is disclosed. The program code is executed by a processor and includes program code to transmit, to a UE, a message comprising a downlink grant for a multicast downlink channel associated with a multicast transmission. The program code further includes program code to transmit, to the UE, a reference signal associated with the downlink channel. The reference signal may be transmitted based on transmitting the message comprising the multicast downlink grant. The program code still further includes program code to receive, from the UE, a unicast message comprising a measurement report indicating a measurement of the reference signal.

Another aspect of the present disclosure is directed to an apparatus for wireless communication at a base station. The apparatus includes a processor, a memory coupled with the processor, and instructions stored in the memory and operable, when executed by the processor, to cause the apparatus to transmit, to a UE, a message comprising a downlink grant for a multicast downlink channel associated with a multicast transmission. Execution of the instructions also cause the apparatus to transmit, to the UE, a reference signal associated with the downlink channel. The reference signal may be transmitted based on transmitting the message comprising the multicast downlink grant. Execution of the instructions also cause the apparatus to receive, from the UE, a unicast message comprising a measurement report indicating a measurement of the reference signal.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
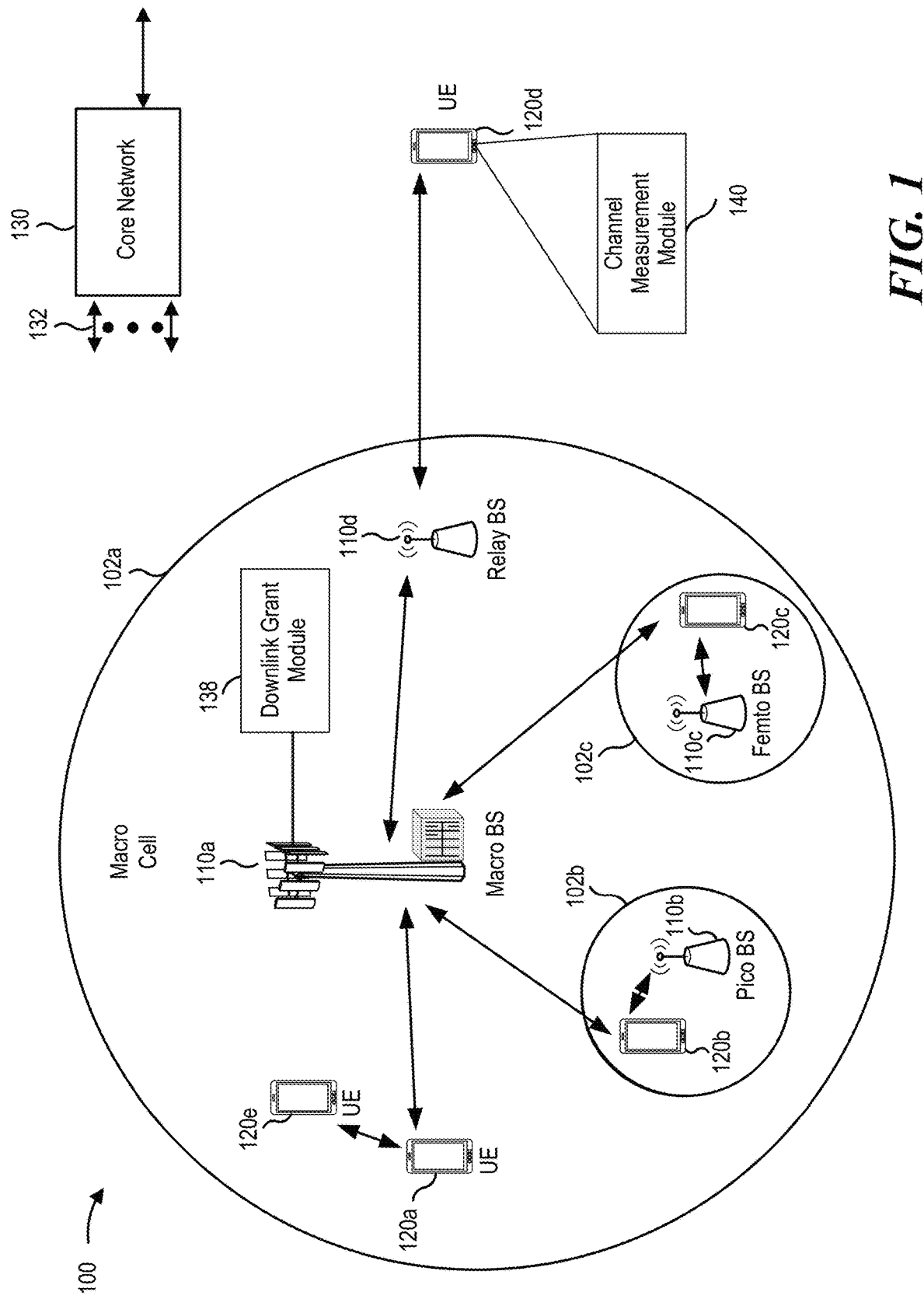
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

As described, in some wireless networks, a base station may dynamically schedule a group of UEs based on channel state information (CSI). In some examples, one or more UEs in a group of UEs may report the CSI based on one or more channel measurements performed by each UE of the one or more UEs. In some such wireless networks, the base station may transmit an uplink grant to trigger a channel measurement, such as an aperiodic CSI reference signal (RS) (A-CSI-RS) measurement. The uplink grant may also request the UE to transmit a channel measurement report, such as an A-CSI measurement report via an uplink shared channel (for example, a physical uplink shared channel (PUSCH)). In such wireless networks, the base station may transmit a different uplink grant to each UE of the group of UEs to trigger a channel measurement and to schedule transmission of a channel measurement report.

Various aspects generally relate to measuring a reference signal associated with a downlink channel, where the downlink channel is scheduled by a multicast downlink grant. Some aspects more specifically relate to a user equipment (UE) receiving, from a base station, the multicast downlink grant for the downlink channel associated with a multicast transmission. In some examples, the multicast downlink grant may be downlink control information (DCI) with a cyclic redundancy check (CRC) scrambled by a group-radio network temporary identifier (G-RNTI) associated with a group of UEs including the UE. Additionally, the multicast downlink grant may be a group transmission that is transmitted to the group of UEs. In such aspects, the UE may receive a reference signal associated with the downlink channel, where the downlink channel is scheduled by the downlink grant. In some examples, the UE may measure the reference signal based on receiving the downlink grant (rather than based on receiving an uplink grant as is typical). Additionally, the UE may transmit, to the base station, a unicast message including a measurement report indicating measurement results, such as values of one or more measurements of the reference signal, or metrics or parameters derived therefrom. In some implementations, the reference signal is an A-CSI-RS and a channel measurement field of the downlink grant indicates the reference signal is an A-CSI-RS. In some implementations, the UE may transmit the unicast message comprising the measurement report via an uplink channel based on a measurement request field of the downlink grant. In some other implementations, the UE may receive an uplink grant that triggers the UE to transmit the unicast message including the measurement report.

Particular aspects of the subject matter described in this disclosure can be implemented to realize one or more of the following potential advantages. In some examples, the described techniques can reduce network overhead by reducing a total number of downlink transmissions to a group of UEs. In such examples, the described techniques reduce the total number of downlink transmissions by transmitting a multicast downlink grant to the group of UEs to trigger channel measurements, such as reference signal measurements. By reducing the total number of downlink transmissions, the described techniques reduce network overhead and also reduce network latency.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with UEs and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, for example, macro BSs, pico BSs, femto BSs, relay BSs, and/or the like. These different types of BSs may have different transmit power levels, different coverage areas, and different impact on interference in the wireless network 100. For example, macro BSs may have a high transmit power level (for example, 5 to 40 Watts) whereas pico BSs, femto BSs, and relay BSs may have lower transmit power levels (for example, 0.1 to 2 Watts).

As an example, the BSs 110 (shown as BS 110a, BS 110b, BS 110c, and BS 110d) and the core network 130 may exchange communications via backhaul links 132 (for example, S1, etc.). Base stations 110 may communicate with one another over other backhaul links (for example, X2, etc.) either directly or indirectly (for example, through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (for example, S1, S2, etc.) and may perform radio configuration and scheduling for communications with the UEs 120. In some configurations, various functions of each access network entity or base station 110 may be distributed across various network devices (for example, radio heads and access network controllers) or consolidated into a single network device (for example, a base station 110).

UEs 120 (for example, 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (for example, a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless communications system 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a channel measurement module 140. For brevity, only one UE 120d is shown as including the channel measurement module 140. The channel measurement module 140 may receive, from a base station 110, a message including a downlink grant for a downlink channel associated with a multicast transmission. In some examples, the downlink grant is a multicast downlink grant. The channel measurement module 140 may also receive, from the base station, a reference signal associated with the downlink channel measure the downlink channel in response to receiving the downlink grant. Additionally, the channel measurement module 140 may measure the reference signal associated with the downlink channel based on receiving the downlink grant. Furthermore, the channel measurement module 140 may transmit, to the base station 110, a unicast message comprising a measurement report indicating a measurement of the reference signal based on measuring the reference signal. In some example, the unicast message may be transmitted based on receiving an uplink grant from the base station 110.

The core network 130 or the base stations 110 may include a downlink grant module 138 for transmitting, to a UE 120, a message including a multicast downlink grant for a downlink channel associated with the multicast transmission. The downlink grant module 138 may also transmit, to the UE 120, a reference signal for measuring the downlink channel based on the multicast downlink grant. Additionally, the downlink grant module 138 may receive, from the UE 120, a unicast message comprising a measurement of the reference signal.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (for example, remote device), or some other entity. A wireless node may provide, for example, connectivity for or to a network (for example, a wide area network such as Internet or a cellular network) via a wired or wireless communications link. Some UEs may be considered Internet-of-Things (IoT) devices, and/or may be implemented as NB-IoT (narrowband Internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via DCI, radio resource control (RRC) signaling, a media access control-control element (MAC-CE) or via system information (for example, a system information block (SIB).

As indicated above, FIG. 1 is provided merely as an example. Other examples may differ from what is described with regard to FIG. 1.

Figure 2:
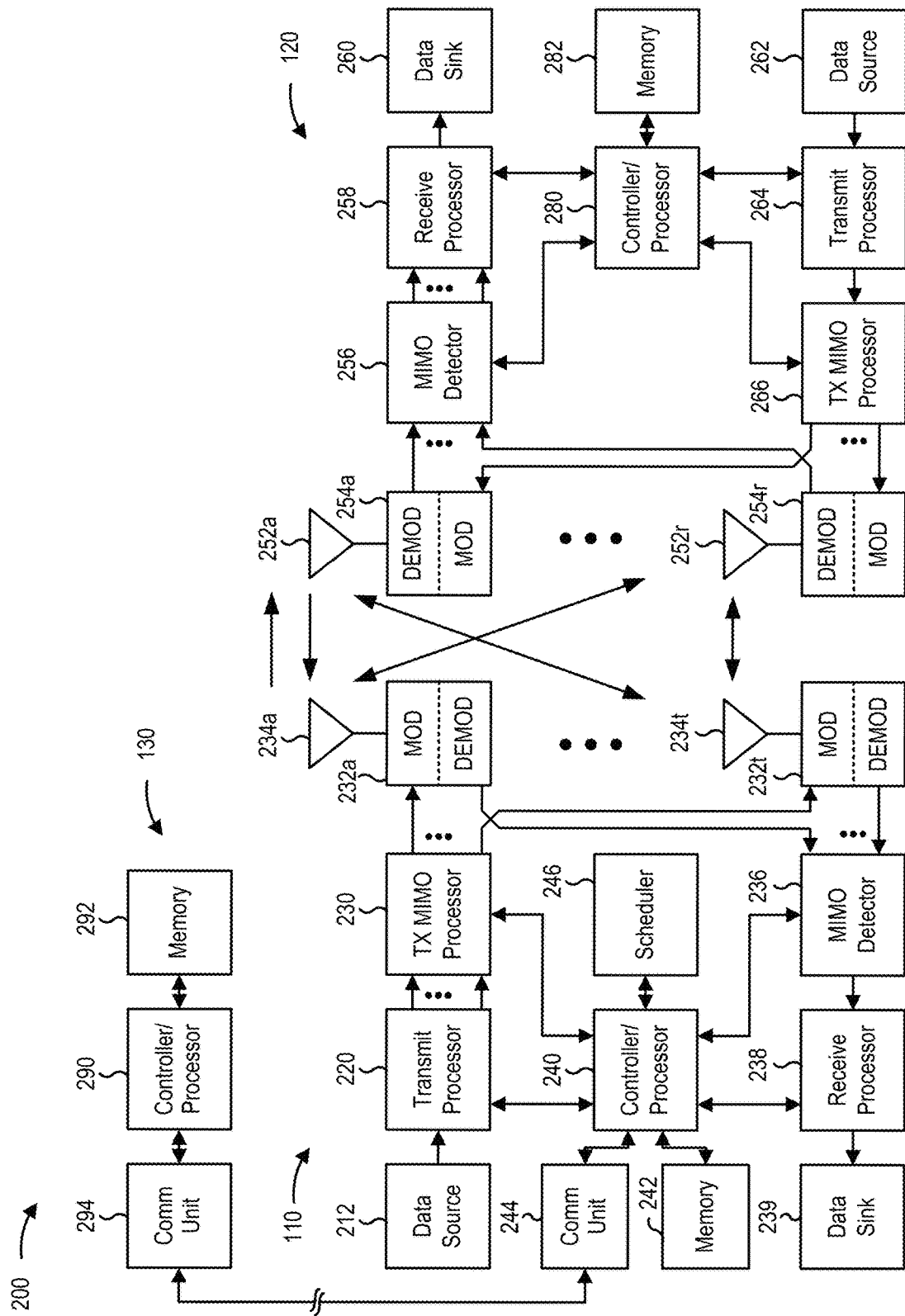
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and/or the like) and control information (for example, CQI requests, grants, upper layer signaling, and/or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232a through 232t. Each modulator 232 may process a respective output symbol stream (for example, for OFDM and/or the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), CQI, and/or the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (for example, for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with measuring a downlink channel associated with a multicast transmission based on a downlink grant as described in more detail elsewhere. For example, the controller/processor 240 of the base station 110, the controller/processor 280 of the UE 120, and/or any other component(s) of FIG. 2 may perform or direct operations of, for example, the process of FIG. 7 and FIG. 8 or other processes as described. Memories 242 and 282 may store data and program codes for the base station 110 and UE 120, respectively. A scheduler 246 may schedule UEs for data transmission on the downlink and/or uplink.

In some wireless systems, a network may dynamically schedule a group of UEs based on CSI. As an example, the network may manage a multicast beam transmitted from a TRP (for example, a base station) and a multicast user group (for example, the group of UEs) based on the CSI. Additionally, one or more UEs in the group may report the CSI. The network is not limited to managing multicast scheduling based on the reported CSI, the network may also manage unicast scheduling based on the reported CSI.

In some conventional wireless systems, an uplink grant may be transmitted to a UE to trigger a channel measurement, such as an A-CSI-RS measurement. The uplink grant may also request the UE to transmit an A-CSI measurement report via an uplink shared channel (for example, a physical uplink shared channel (PUSCH)). In such cases, the base station may transmit a different uplink grant to each UE of a group of UEs to request the A-CSI report for a multicast transmission to the group of UEs.

Figure 3:
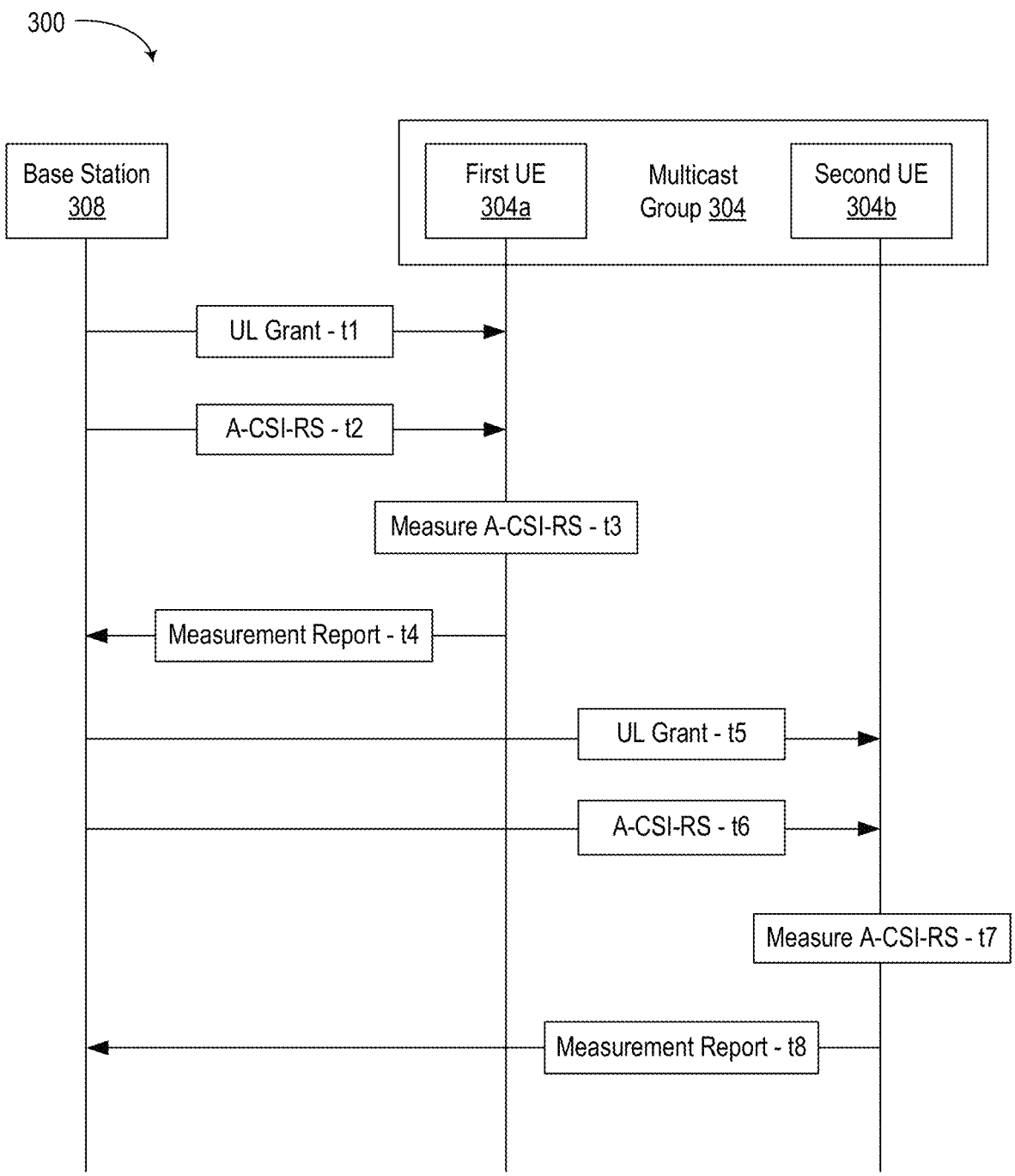
FIG. 3 is a timing diagram illustrating an example for transmitting different uplink (UL) grants to UEs, in accordance with various aspects of the present disclosure.

FIG. 3 is a timing diagram illustrating an example 300 for transmitting different uplink (UL) grants to UEs 304a and 304b. As shown in FIG. 3, a first UE 304a and a second UE 304b may be in a multicast group 304 served by a base station 308. The first UE 304a and the second UE 304b may be examples of the UEs 120 described with reference to FIG. 1. Additionally, the base station 308 may be an example of the base station 110 described with reference to FIG. 1. In this example, the UEs 304a and 304b receive different UL grants from the base station 308. For example, as shown in FIG. 3, the first UE 304a receives an UL grant at time t1, and the second UE 304b receives an UL grant at time t5. Each UL grant may schedule resources for an UL shared channel transmission (for example, a PUSCH transmission) from the respective UEs 304a and 304b. In this example, each UL grant transmission by the base station 308 may trigger a corresponding A-CSI-RS transmission from the base station 308. For example, as shown in FIG. 3, an A-CSI-RS transmission may be triggered at time t2 based on the base station 308 transmitting the UL grant at time t1. The first UE 304a may measure the A-CSI-RS at time t3. Also, the first UE 304a may transmit a measurement report (for example, a CSI measurement report), at time t4, indicating a measurement of the A-CSI-RS based on the measurement of the A-CSI-RS performed at time t3. The measurement report transmitted at time t4 may be transmitted via the UL shared channel scheduled by the UL grant of time t1. Additionally, as shown in FIG. 3, the UL grant transmitted at time t5 to the second UE 304b triggers an A-CSI-RS transmission from the base station 308 at time t6. In such examples, the second UE 304b may measure the A-CSI-RS at time t7. Also, the second UE 304b may transmit a measurement report, at time t8, indicating a measurement of the A-CSI-RS based on the measurement of the A-CSI-RS performed at time t7. The measurement report transmitted at time t8 may be transmitted via the UL shared channel scheduled by the UL grant of time t5. The UL grants (times t1 and t5) as well as the A-CSI-RSs (times t2 and t6) may increase network bandwidth and reduce a reliability of multicast channels.

Figure 4A:
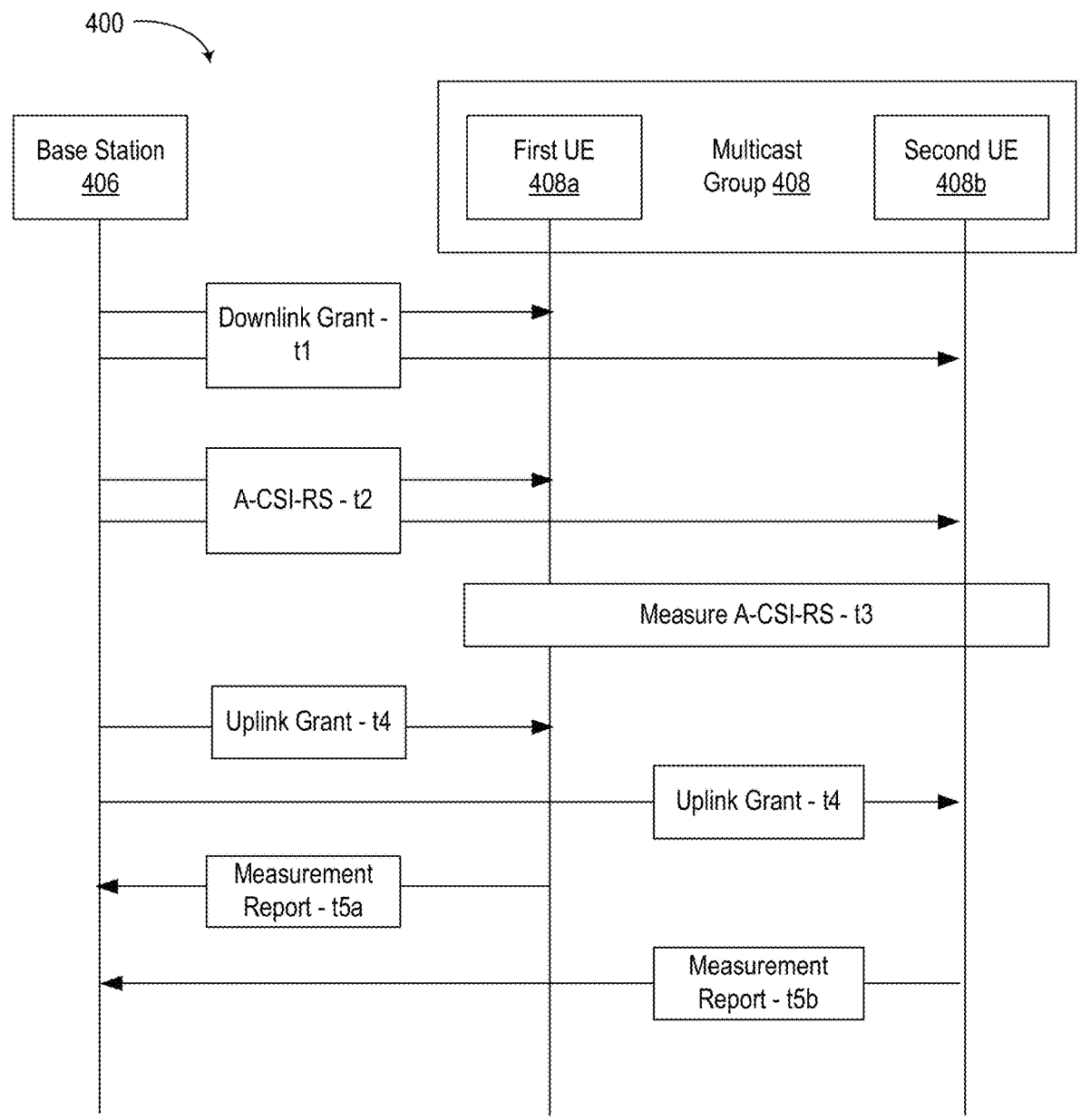
FIG. 4A is a timing diagram illustrating an example of triggering a channel measurement for a group of UEs based on a downlink grant, in accordance with aspects of the present disclosure.

Aspects of the present disclosure are directed to transmitting a downlink grant to trigger channel measurement for a group of UEs. The downlink grant may be a unicast downlink grant or a multicast downlink grant. FIG. 4A is a timing diagram 400 illustrating an example of triggering a channel measurement for a multicast group of UEs 408 based on a downlink grant, in accordance with aspects of the present disclosure. In the example of FIG. 4A, a base station 406 may serve a multicast group 408. The base station 406 may be an example of the base station 110 described with reference to FIG. 1. The multicast group 408 may include a first UE 408a and a second UE 408b. The multicast group 408 is not limited to two UEs (for example, the first UE 408a and the second UE 408b), additional UEs may be members of the multicast group 408. The first UE 408a and the second UE 408b may be examples of the UEs 120 described with reference to FIG. 1. In this example, the base station 406 may transmit respective unicast messages to individual UEs 408a and 408b, or multicast messages to the UEs 408a and 408b.

As shown in FIG. 4A, at time t1, the base station 406 transmits a downlink grant to each UE 408a and 408b. The downlink grant may be a unicast downlink grant separately transmitted to each UE 408a and 408b. In some such examples, the downlink grant may be scrambled by UE-specific RNTI (for example, cell-RNTI (C-RNTI)). Alternatively, the downlink grant may be a multicast downlink grant transmitted to the group of UEs 408 (for example, both the first UE 408a and the second UE 408b). For illustrative purposes, the downlink grant of FIG. 4A is a multicast grant. The downlink grant may be a grant for a downlink channel (for example, physical downlink shared channel (PDSCH)) associated with a multicast transmission. Each UE 408a and 408b may provide feedback (for example, an acknowledgment (ACK) or a negative acknowledgment (NACK)) via an uplink control channel based on a data transmission received on the downlink channel (not shown in FIG. 4A).

As shown in the example of FIG. 4A, at time t2, the base station 406 may transmit an A-CSI-RS to each UE 408a and 408b in the multicast group of UEs 408 based on transmitting the downlink grant at time t1. The A-CSI-RS may be associated with the downlink channel granted by the downlink grant. In this example, each UE 408a and 408b may measure the A-CSI-RS at time t3. In some examples, the A-CSI-RS may be associated with one or more resource sets. In some such examples, the one or more resource sets may be configured based on RRC signaling received at the UE. In other examples, a parameter of a multicast transmission (for example, G-RNTI) may implicitly configure the resource sets for the A-CSI-RS. Additionally, in some implementations, a time offset between a transmission time of the downlink grant (time t1) and a transmission time of the A-CSI-RS (time t2) may be a pre-defined time offset or a dynamic time offset that is configured via RRC signaling. Also, in some implementations, a channel measurement field in the downlink grant (for example, DCI) may trigger the UE to measure the A-CSI-RS. As described, the downlink grant may be a multicast downlink grant. In this example, a G-RNTI may scramble the downlink grant. CSI-RS resource sets configured for the multicast transmission may configure a number of bits of the channel measurement field. The CSI-RS resource sets may be pre-defined or indicated by RRC signaling. The A-CSI-RS resource sets may be confined within the common frequency resources (CFR) used for the multicast transmission. In some examples, the CFR may be confined within a range of the dedicated BWP for unicast transmission using a same numerology, such as a same subcarrier spacing and cyclic prefix.

In the example of FIG. 4A, at time t4, the base station 406 may transmit a unicast uplink grant to each UE 408a and 408b. Each unicast uplink grant may request the respective UEs 408a and 408b to transmit a measurement report, such as A-CSI-RS measurement report based on the A-CSI-RS measured at time t2. In one implementation, a measurement report field of the unicast uplink grant may trigger the UE to transmit the measurement report. As described above, current wireless systems transmit an UL grant to trigger A-CSI-RS measurements at the UE. That is, in some conventional wireless systems, the UL grant may include a channel measurement field indicating the base station may transmit an A-CSI-RS after transmitting the UL grant. In some aspects of the present disclosure, the channel measurement field of the UL grant described in FIG. 4A does not indicate transmission of an A-CSI-RS by the base station after transmission of the UL grant. In other implementations, the UL grant may add one or more bits to indicate whether the UL grant triggers an A-CSI-RS transmission at the base station. In other implementations, a CSI configuration, such as a CSI resource configuration, may indicate that the UL grant may not trigger the A-CSI-RS if the UE receives the A-CSI-RS triggered by the downlink grant.

In some implementations, the network may configure each UE 408a, 408b to monitor a downlink control channel for the UL grant. The network may pre-define a time window for monitoring the UL grant. Alternatively, the time window may be a dynamic time window that is configured via RRC signaling. In some examples, the time window may be a number of slots after a last slot of a downlink control channel of the DL grant, a last slot of the A-CSI-RS, or a last slot of the downlink shared channel scheduled by the DL grant. In such implementations, the UE may discard the A-CSI measurement if the UL grant is not received during the time window.

At time t5a, the first UE 408a may transmit a unicast message including a measurement report indicating a value for the measurement performed at time t3. Additionally, at time t5b, the second UE 408b transmits a unicast message including a measurement report indicating a value for the measurement performed at time t3. The measurement reports may be A-CSI-RS measurement reports based on the A-CSI-RS measured at time t2. The UEs 408a and 408b may transmit the respective unicast messages at times t5a and t5b based on the unicast uplink grant transmitted at time t4.

Figure 4B:
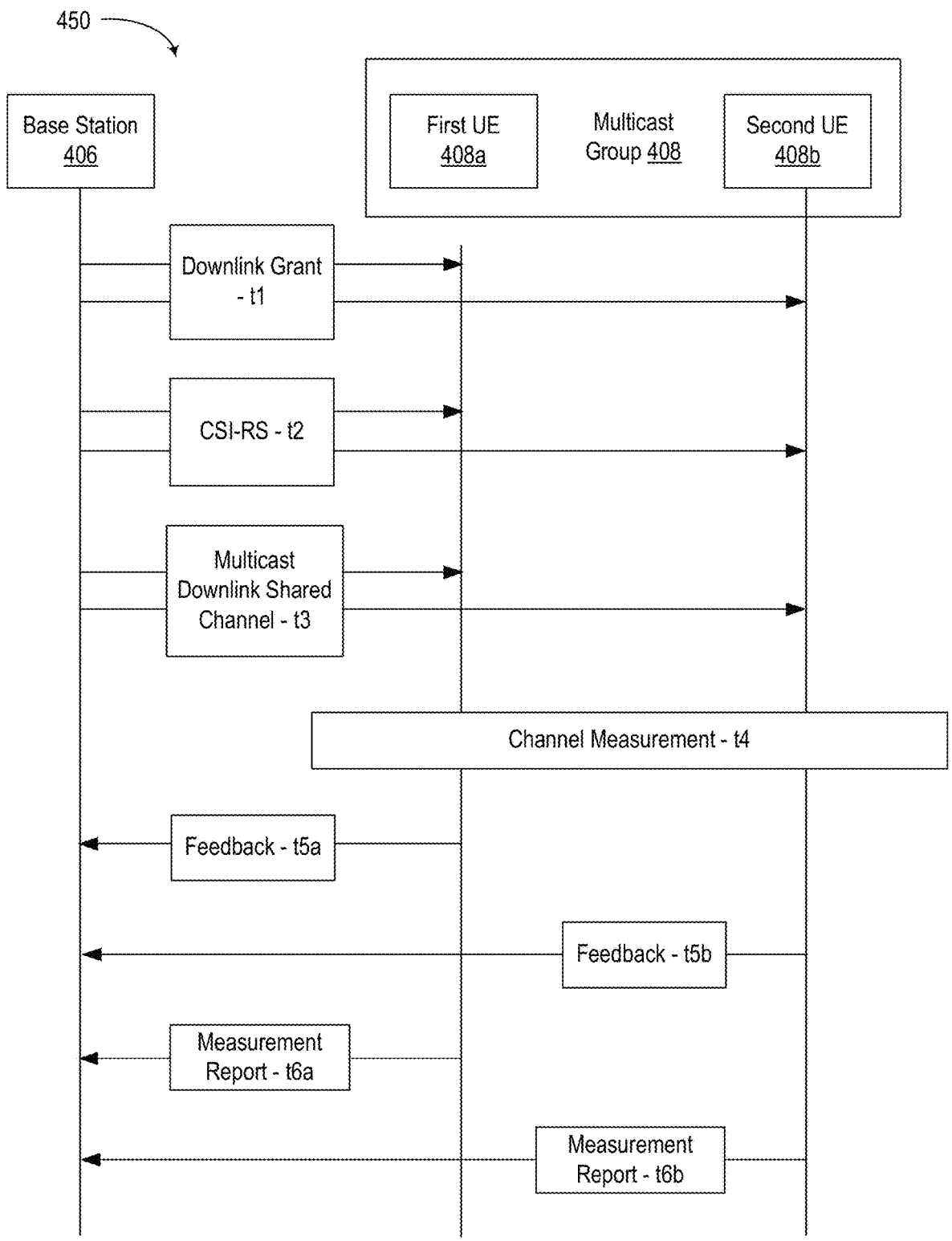
FIG. 4B is a timing diagram illustrating an example of triggering a channel measurement for a group of UEs based on a downlink grant, in accordance with aspects of the present disclosure.

FIG. 4B is a timing diagram 450 illustrating an example of triggering a channel measurement for a group of UEs 408 based on a downlink grant, in accordance with aspects of the present disclosure. As shown in FIG. 4B, at time t1, the base station 406 transmits a downlink grant to the multicast group 408. The downlink grant may be a unicast downlink grant separately transmitted to each UE 408a and 408b in the multicast group 408. Alternatively, the downlink grant may be a multicast downlink grant transmitted to the multicast group 408. For illustrative purposes, the downlink grant of FIG. 4B is a multicast grant. The downlink grant may be a grant for a downlink channel (for example, PDSCH) associated with a multicast transmission. In one implementation, the downlink grant may include a measurement field (for example, channel measurement field) to trigger each UE 408a and 408b to perform channel measurements (for example, CSI measurements). In the example of FIG. 4B, the base station 406 may transmit one or more reference signals, such as CSI-RSs (for example, periodic or semi-static CSI-RS), at time t2. In some examples, the CSI-RS transmitted at time t2 may be configured based on RRC signaling or MAC-CE signaling. The RRC signaling or the MAC-CE signaling may be associated with a downlink multicast bandwidth part (BWP). Also, in the example of FIG. 4B, at time t3, the base station 406 transmits a multicast downlink shared channel based on transmitting the downlink grant at time t1. The base station 406 may scramble the multicast downlink shared channel with a G-RNTI. Additionally, the multicast downlink shared channel may include one or more demodulation reference signals (DMRSs).

In the example of FIG. 4B, at time t4, each UE 408a and 408b performs a channel measurement based on the measurement field of the downlink grant. In one implementation, the measurement may be a CRI-RS measurement triggered based on an indication in the measurement field of the downlink grant. In some examples, the measurement field indicates that the reference signal is a CSI-RS. In this implementation, at time t4, the UEs 408a and 408b measure the one or more CSI-RSs transmitted at time t2. In another implementation, the measurement field indicates the reference signal is a DMRS, thereby triggering a DMRS measurement at the UEs 408a and 408b. In some examples, the DMRS may be implicitly transmitted. As an example, transmission of the DRMS may be implicitly triggered based on a physical downlink shared channel (PDSCH) detection failure. In this implementation, at time t4, the UEs 408a and 408b measure the one or more DMRSs included in the multicast downlink shared channel transmitted at time t3 based on the measurement field. In some examples, the UEs 408a and 408b may determine a CQI value of allocated resource blocks based on the measurements of the one or more DMRSs.

Additionally, in the example of FIG. 4B, at time t5a, the first UE 408a transmits feedback, such as an ACK or a NACK, based on the multicast downlink shared channel transmitted at time t4. Also, at time t5b, the second UE 408b transmits feedback based on the multicast downlink shared channel transmitted at time t3. The feedback may be transmitted via an uplink control channel. Furthermore, in the example of FIG. 4B, at time t6a, the first UE 408a transmits a unicast message including a channel measurement report indicating a channel measurement value based on the channel measurement (for example, reference signal measurement) performed at time t4. As an example, the channel measurement report may indicate a CQI value. Additionally, at time t6b, the second UE 408b transmits a unicast message including a channel measurement report indicating a channel measurement value based on the channel measurement performed at time t4. The first UE 408a and second UE 408b may transmit the unicast messages via an uplink control channel or an uplink shared channel.

As described above, in one implementation, a measurement report field of a unicast uplink grant received at a UE, such as the first UE 408a or the second UE 408b, may trigger the UE to transmit the measurement report via an uplink shared channel. In another implementation, a measurement report field of the downlink grant may trigger the UE to transmit the measurement report via the uplink control channel. A size (for example, number of bits) of the measurement report field in the downlink grant may be different from a size of a measurement report field in the unicast uplink. The size of the measurement report field in the downlink grant may be pre-defined or indicated by an RRC parameter (for example, reportTriggerSize) for the downlink grant. A measurement of an A-CSI-RS triggered by the downlink grant, a periodic or semi-static CSI-RS, or a DMRS, may be used for the measurement report.

In one implementation, resources for transmitting an aperiodic measurement report (for example, an A-CSI-RS report) may be reserved uplink control channel resources for periodic measurement reporting, uplink control channel resources for unicast feedback, or dedicated uplink control resources. In this implementation, the aperiodic measurement report may include a channel measurement value based on measurements of the A-CSI-RS, periodic CSI-RS, or DMRS. Additionally, in this implementation, RRC signaling or the downlink grant may indicate the resources for the uplink control channel.

As described, in one aspect of the present disclosure, the resources may be reserved periodic uplink control channel resources for CSI reporting. In this example, the UE determines a minimum time offset relative to a time of the downlink grant. The UE may select a first set of resources allocated to an uplink control channel occasion that satisfies the minimum time offset. The minimum time offset may be a minimum time specified between a reception time of the downlink grant and a transmission time of the aperiodic measurement report. In some examples, the uplink control channel may be reserved for periodic channel measurement reporting. Uplink control channel resources can use UE-specific resources, time/frequency resources, or an orthogonal cover code (OCC) on the same resource blocks. In one implementation, the UE prioritizes the aperiodic measurement report over a periodic measurement report. In another implementation, the UE may compress the aperiodic measurement report and the periodic measurement report. In such an implementation, the aperiodic measurement report and the periodic measurement report may be associated with different CSI-RS resource sets.

In another aspect of the present disclosure, the UE transmits the aperiodic measurement report using uplink control channel resources allocated for unicast feedback. In some examples, the aperiodic measurement report may be piggy-backed on an uplink channel allocated for feedback, such as ACK/NACK. In some such examples, the downlink grant may indicate UE-specific uplink channel resources to transmit the ACK/NACK feedback and the aperiodic measurement report.

In yet other aspects of the present disclosure, the downlink grant dedicates uplink control channel resources for transmitting the aperiodic measurement report. In this aspect, the downlink grant may include one or more fields indicating parameters of the dedicated uplink control channel resources. For example, the one or more fields may indicate an RRC configured uplink control channel resource set, a slot offset for the uplink control channel, and a power offset for the uplink control channel. As an example, unicast RRC signaling may configure different sets of uplink control channel resources for the UE. In this example, the downlink grant indicates one of the sets of uplink control channel resources to be used for transmitting the aperiodic measurement report. As described, a field of the downlink grant may also indicate a slot offset for the uplink control channel. In one implementation, if the downlink grant does not indicate the slot offset, a pre-defined offset may be used. The slot offset may be an offset between a starting slot of the uplink control channel and one of a last slot of a downlink control channel used for transmitting the downlink grant, a last slot of a downlink shared channel (for example, if the aperiodic measurement report is based on the DMRS) or a last slot of a control channel for transmitting ACK/NACK feedback.

As described above, a field of the downlink grant may also indicate an uplink transmission power (for example, uplink control channel power control) for transmitting the aperiodic measurement report. In one implementation, the aperiodic measurement report uplink transmission power is the same as the ACK/NACK feedback uplink transmission power. In another implementation, the aperiodic measurement report uplink transmission power is an offset relative to the ACK/NACK feedback uplink transmission power. In still another implementation, the aperiodic measurement report uplink transmission power is independent from the ACK/NACK feedback uplink transmission power.

According to some aspects of the present disclosure, the UE triggers transmission of an aperiodic channel measurement report. In such aspects, a measurement of one of the A-CSI-RS, the periodic CSI-RS, or the DMRS may be used for the aperiodic channel measurement report. In some examples, the UE may determine whether a downlink channel quality value of the downlink channel associated with the multicast transmission is less than a channel quality threshold. In such examples, when the downlink channel quality value is less than the channel quality threshold, the aperiodic channel measurement report may be transmitted. Transmission of the measurement report may occur via a MAC-CE or data payload of an uplink data channel scheduled by a unicast uplink grant.

In some examples, the UE may compress the measurement report when the measurement report is transmitted in the MAC-CE. For example, the UE may limit the measurement report to a wideband CSI report (for example, a 4-bit CQI). In such an example, the measurement report may also include a resource indicator (RI) and a CSI-RS resource indicator (CRI). The RI may be a 1-bit RI and the CRI may be a 3-bit CRI. The UE may request the unicast uplink grant via a dedicated scheduling request for measurement reporting or a scheduling request for an uplink shared channel. The downlink channel quality value may be a CQI value determined from a signal quality measurement, such as a signal to interference noise ratio (SINR). The channel quality threshold may be preconfigured or configured based on RRC signaling.

According to aspects of the present disclosure, a multicast channel measurement configuration may be based on a multicast downlink channel. The multicast channel measurement configuration may include parameters for channel measurement resources, such as the A-CSI-RS, periodic CSI-RS, and DMRS. The multicast channel measurement configuration may be different from a unicast channel measurement configuration based on a unicast downlink channel. As an example, multicast channel measurement configuration may be based on a DMRS configuration for a multicast downlink shared channel and the unicast channel measurement configuration may be based on the DMRS configuration for a unicast downlink shared channel. The multicast channel measurement configuration may configure one or both of a ratio of a downlink shared channel energy per resource element (EPRE) relative to a CSI-RS EPRE or a number of demodulation reference signals in a downlink shared channel.

In some implementations, a power offset for non-zero power (NZP)-CSI-RS may be dependent on a parameter, such as a configured powerControlOffsetSS, relative to a synchronization signal block (SSB) for a multicast transmission. In other implementations, a power offset for the DMRS of the multicast downlink shared channel may be dependent on a number of DMRS cloud data management (CDM) groups based on the configured DMRS-Type for the multicast transmission. In some implementations, a number of front-loaded DMRS symbols may be configured by a field, such as maxLength, in a configuration, such as DMRS-DownlinkConfig, for the multicast transmission. Additionally, a number of additional DMRS symbols may be configured by a field, such as dmrs-AdditionalPosition, in a configuration, such as DMRS-DownlinkConfig, for the multicast transmission.

As described, according to aspects of the present disclosure, the downlink grant may be a unicast grant or a multicast grant. In some examples, the downlink grant may trigger a base station to transmit non-zero power (NZP) RSs (for example, A-CSI-RS). In some implementations, a time offset relative to a slot containing the downlink grant may indicate a transmission slot of an RS. In other examples, the time offset is relative to a slot of a multicast downlink shared channel scheduled by the downlink grant. As an example, for the multicast downlink grant, the time offset for the A-CSI-RS may be relative to the slot of the downlink grant, which may be indicated by RRC signaling. As another example, for the unicast downlink grant, the time offset for the A-CSI-RS may be relative to the slot of the downlink grant, which may be indicated by the DCI to select one of the RRC configured candidate values. An A-CSI-RS field of the downlink DCI may indicate that an A-CSI-RS transmission from the base station is not triggered. In another example, the time offset may be indicated by RRC signaling when the unicast downlink grant for the UEs in the group, interested in the multicast reception, is transmitted in a same slot. In yet another example, the time offset for the A-CSI-RS may be defined relative to the slot of the multicast downlink shared channel, indicated by the RRC signaling.

In some other implementations, the UE may measure the A-CSI-RS indicated by the unicast uplink grant, where the time offset for the A-CSI-RS relative to the slot of the uplink grant is selected based on a field in the uplink DCI indicating RRC configured candidate values. In such implementations, the slot of the uplink grant is associated with one of the RRC configured candidate values. The unicast uplink grants for the UEs in the group may indicate a common A-CSI-RS for channel measurements (for example, CSI measurements) of the downlink multicast channel. An A-CSI-RS field of the uplink DCI may indicate that an A-CSI-RS transmission from the base station is not triggered. In one example, the time offset may be indicated by RRC signaling when the unicast uplink grant for the UEs in the group is transmitted in a same slot. In some examples, UEs in the group may indicate interest in a multicast transmission. In such example, the unicast uplink grant is transmitted to the UEs indicating interest in the multicast transmission.

Figure 5:
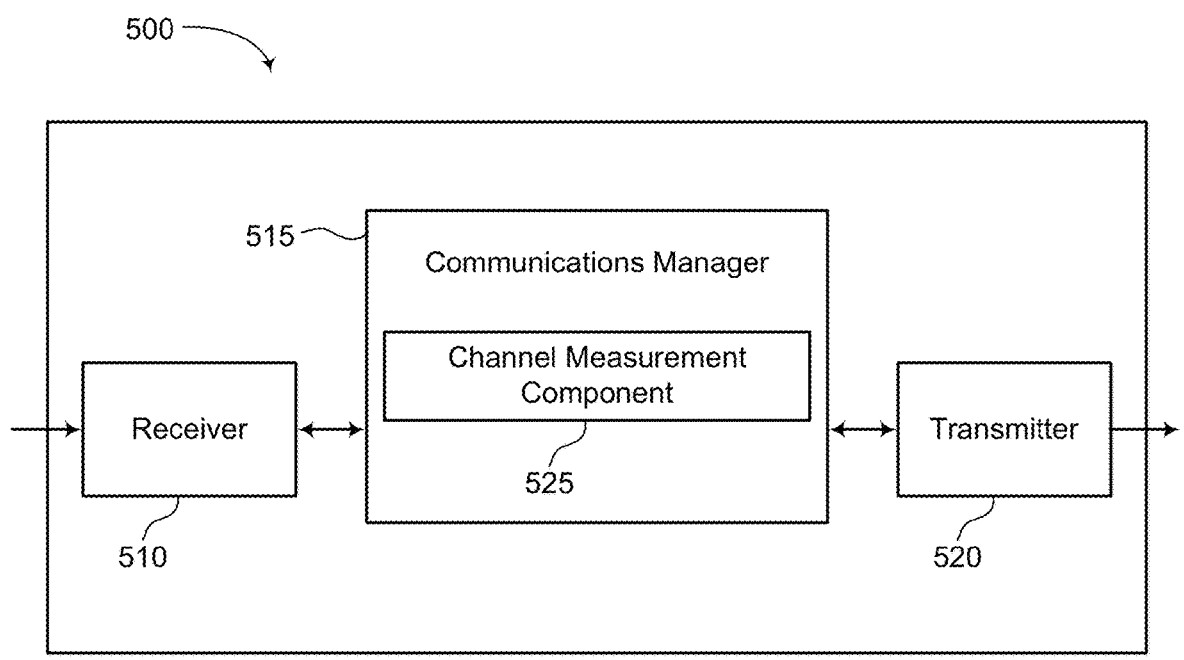
FIG. 5 is a block diagram illustrating an example of a wireless communication device that supports measuring a downlink channel associated with a multicast transmission based on a downlink grant, in accordance with aspects of the present disclosure.

FIG. 5 is a block diagram illustrating an example of a wireless communication device 500 that supports measuring a downlink channel associated with a multicast transmission based on a downlink grant, in accordance with aspects of the present disclosure. The device 500 may be an example of aspects of a UE 120a, 120b, 120c, 120d, 120e, 408a, or 408b described with reference to FIGS. 1, 4A, and 4B. The wireless communication device 500 may include a receiver 510, a communications manager 515, and a transmitter 520, which may be in communication with one another (for example, via one or more buses). In some examples, the wireless communication device 500 is configured to perform operations including operations of the process 700 described below with reference to FIG. 7.

In some examples, the wireless communication device 500 can include a chip, chipset, package, or device that includes at least one processor and at least one modem (for example, a 5G modem or other cellular modem). In some examples, the communications manager 515, or its subcomponents, may be separate and distinct components. In some examples, at least some components of the communications manager 515 are implemented at least in part as software stored in a memory. For example, portions of one or more of the components of the communications manager 515 can be implemented as non-transitory code executable by the processor to perform the functions or operations of the respective component.

The receiver 510 may receive one or more of reference signals (for example, periodically configured CSI-RSs, aperiodically configured CSI-RSs, or multi-beam-specific reference signals), synchronization signals (for example, SSBs), control information and data information, such as in the form of packets, from one or more other wireless communication devices via various channels including control channels (for example, a physical downlink control channel (PDCCH)) and data channels (for example, a PDSCH). The other wireless communication devices may include, but are not limited to, a base station 110 or 406 described with reference to FIGS. 1 and 4.

The received information may be passed on to other components of the device 500. The receiver 510 may be an example of aspects of the receive processor 258 described with reference to FIG. 2. The receiver 510 may include a set of radio frequency (RF) chains that are coupled with or otherwise utilize a set of antennas (for example, the set of antennas may be an example of aspects of the antennas 252a through 252r described with reference to FIG. 2).

The transmitter 520 may transmit signals generated by the communications manager 515 or other components of the wireless communication device 500. In some examples, the transmitter 520 may be collocated with the receiver 510 in a transceiver. The transmitter 520 may be an example of aspects of the transmit processor 254 described with reference to FIG. 2. The transmitter 520 may be coupled with or otherwise utilize a set of antennas (for example, the set of antennas may be an example of aspects of the antennas 252a through 252r described with reference to FIG. 2), which may be antenna elements shared with the receiver 510. In some examples, the transmitter 520 is configured to transmit control information in a physical uplink control channel (PUCCH) and data in a PUSCH.

The communications manager 515 may be an example of aspects of the controller/processor 280 described with reference to FIG. 2. The communications manager 515 includes a channel measurement component 525. In one implementation, working in conjunction with the receiver 510, the communications manager 515 may receive a message including a downlink grant for a downlink channel associated with a multicast transmission. In some examples, the downlink grant is a multicast downlink grant. In this implementation, working in conjunction with the receiver 510, the communications manager 515 may also receive a reference signal associated with the downlink channel. Additionally, the channel measurement component 525 may measure the reference signal associated with the downlink channel based on receiving the downlink grant. The channel measurement component 525 may forward the measurement to the communications manager 515. Furthermore, working in conjunction with the transmitter, the communications manager 515 may transmit a unicast message including a measurement report indicating a measurement of the reference signal based on the measurement performed by the measurement component 525.

Figure 6:
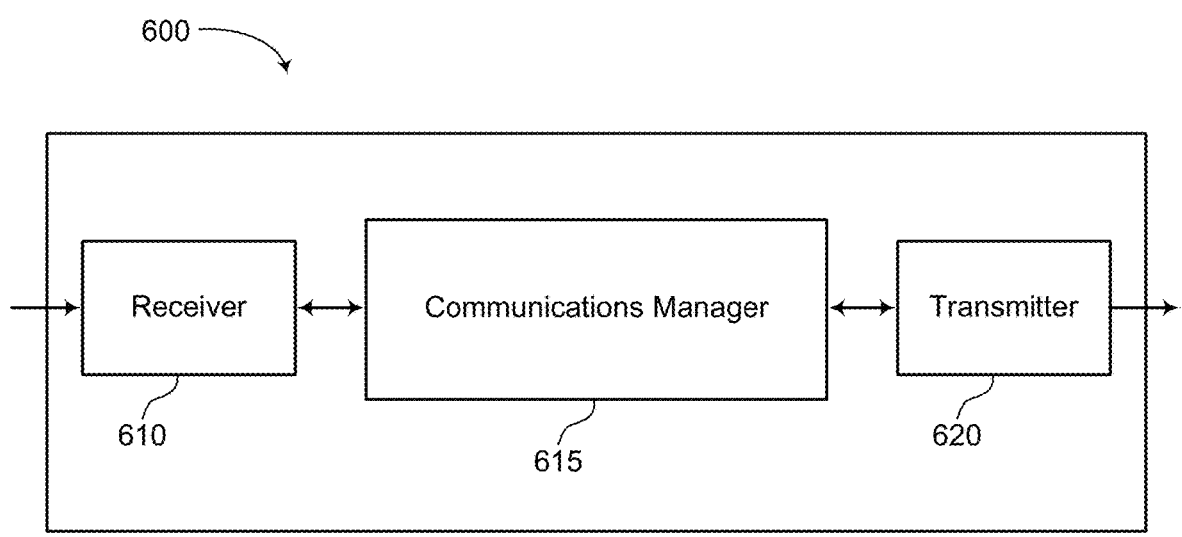
FIG. 6 is a block diagram illustrating an example of a wireless communication device that supports transmitting a downlink grant to initiate a channel measurement for a downlink channel associated with a multicast transmission, in accordance with aspects of the present disclosure.

FIG. 6 is a block diagram illustrating an example of a wireless communication device 600 that supports transmitting a downlink grant to initiate a channel measurement for a downlink channel associated with a multicast transmission, in accordance with aspects of the present disclosure. The device 600 may be an example of aspects of a base station, such as a base station 110a, 110b, 110c, or 406 described with reference to FIGS. 1, 4A, and 4B. The device 600 may implement an architecture for supporting downlink grant transmissions for initiating channel measurements for a downlink channel associated with a multicast transmission. The wireless communication device 600 may include a receiver 610, a communications manager 615, and a transmitter 620, which may be in communication with one another (for example, via one or more buses). In some examples, the wireless communication device 600 is configured to perform operations, including operations of the process 800 described below with reference to FIG. 8.

In some examples, the wireless communication device 600 can include a chip, chipset, package, or device that includes at least one processor and at least one modem (for example, a 5G modem or other cellular modem). In some examples, the communications manager 615, or its subcomponents, may be separate and distinct components. In some examples, at least some components of the communications manager 615 are implemented at least in part as software stored in a memory. For example, portions of one or more of the components of the communications manager 615 can be implemented as non-transitory code executable by the processor to perform the functions or operations of the respective component.

The receiver 610 may receive one or more of signals, control information and data information, such as in the form of packets, from one or more other wireless communication devices via various channels including control channels (for example, a PUCCH) and data channels (for example, a physical uplink shared channel (PUSCH)). The other wireless communication devices may include, but are not limited to, a UE 120 as described with reference to FIG. 1. In aspects of the present disclosure, the wireless communication device 600 may forward and receive information via a backhaul connection.

The device 600 may pass received information to other components of the device 600. The receiver 610 may be an example of aspects of the receive processor 238 described with reference to FIG. 2. The receiver 610 may include a set of RF chains that are coupled with or otherwise utilize a set of antennas (for example, the set of antennas may be an example of aspects of the antennas 234a through 234t described with reference to FIG. 2).

The transmitter 620 may transmit signals generated by the communications manager 615 or other components of the wireless communication device 600. In some examples, the transmitter 620 may be collocated with the receiver 610 in a transceiver. The transmitter 620 may be an example of aspects of the transmit processor 220 described with reference to FIG. 2. The transmitter 620 may be coupled with or otherwise utilize a set of antennas (for example, the set of antennas may be an example of aspects of the antennas 234a through 234t described with reference to FIG. 2), which may be antenna elements shared with the receiver 610. In some examples, the transmitter 620 is configured to transmit control information in a PDCCH and data in a PDSCH.

The communications manager 615 may be an example of aspects of the controller/processor 240 described with reference to FIG. 2. In one implementation, working in conjunction with the transmitter 620, the communications manager 615 may transmit a message including a downlink grant for a downlink channel associated with a multicast transmission. As an example, the downlink grant may be a multicast grant. Additionally, working in conjunction with the transmitter 620, the communications manager 615 may transmit a reference signal associated with the downlink channel. In some examples, the reference signal may be transmitted based on transmitting the downlink grant. As an example, the reference signal may be an A-CSI-RS. In other examples, the reference signal may be a CSI-RS or a DMRS. Furthermore, working in conjunction with the receiver 610, the communications manager 615 may receive a unicast message comprising a measurement report indicating a measurement of the reference signal.

Figure 7:
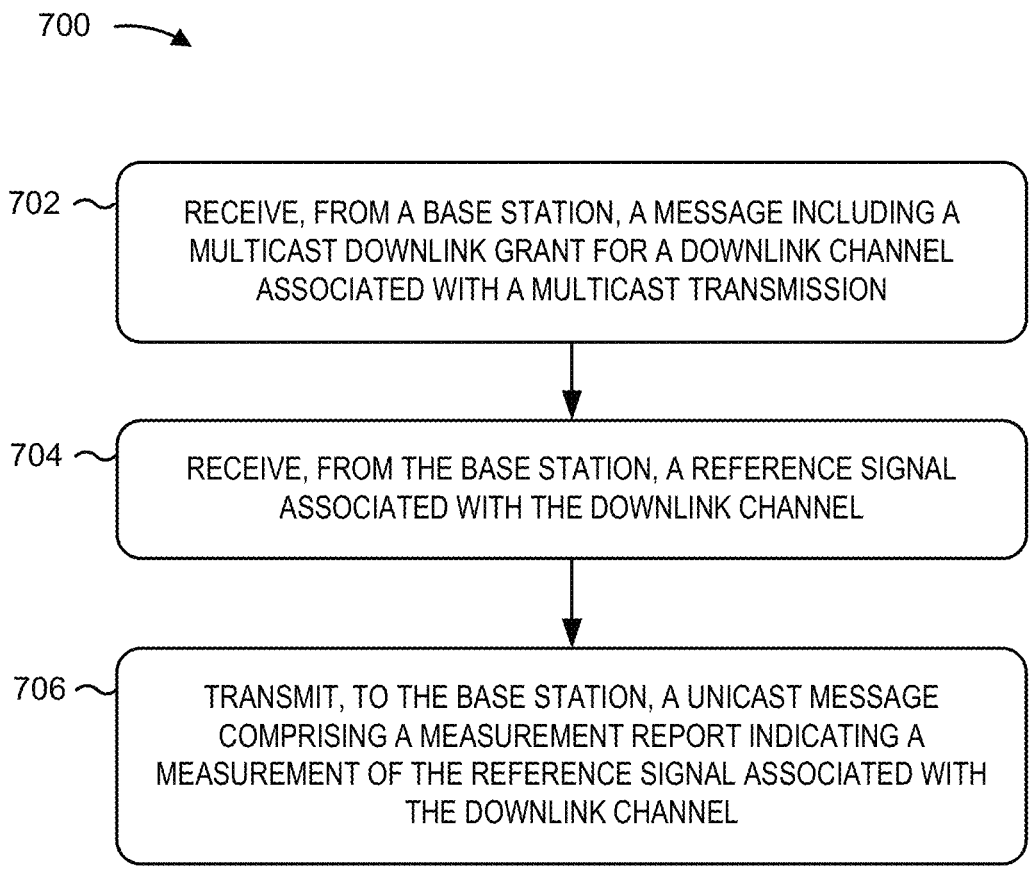
FIG. 7 is a flow diagram illustrating an example process performed at a UE that supports measuring a downlink channel associated with a multicast transmission based on a downlink grant, in accordance with various aspects of the present disclosure.

FIG. 7 is a flow diagram illustrating an example process performed at a UE that supports measuring a downlink channel associated with a multicast transmission based on a downlink grant, in accordance with various aspects of the present disclosure. The example process 700 is an example of measuring a downlink channel associated with a multicast transmission based on a downlink grant, in accordance with various aspects of the present disclosure. The operations of the process 700 may be implemented by a UE, such as a UE 120a, 120b, 120c, 120d, 120e, 408a, or 408b, or its components, described with reference to FIGS. 1, 4A, and 4B. For example, operations of the process 700 may be performed by a communications manager 515 and a channel measurement component 525 as described with reference to FIG. 5. In some examples, a UE may execute a set of instructions to control the functional elements of the UE to perform the operations or functions described below. Additionally, or alternatively, a UE may perform aspects of the operations or functions described below using special-purpose hardware.

In block 702, the UE receives, from a base station, a message including a downlink grant for a downlink channel associated with a multicast transmission. In some examples, the downlink grant may be a multicast grant. In block 704, the UE receives, from the base station, a reference signal associated with the downlink channel. As an example, the reference signal may be an A-CSI-RS. In some examples, the UE measures the reference signal associated with the downlink channel based on receiving the downlink grant. In block 706, the UE transmits, to the base station, a unicast message comprising a measurement report indicating a measurement of the reference signal associated with the downlink channel.

Figure 8:
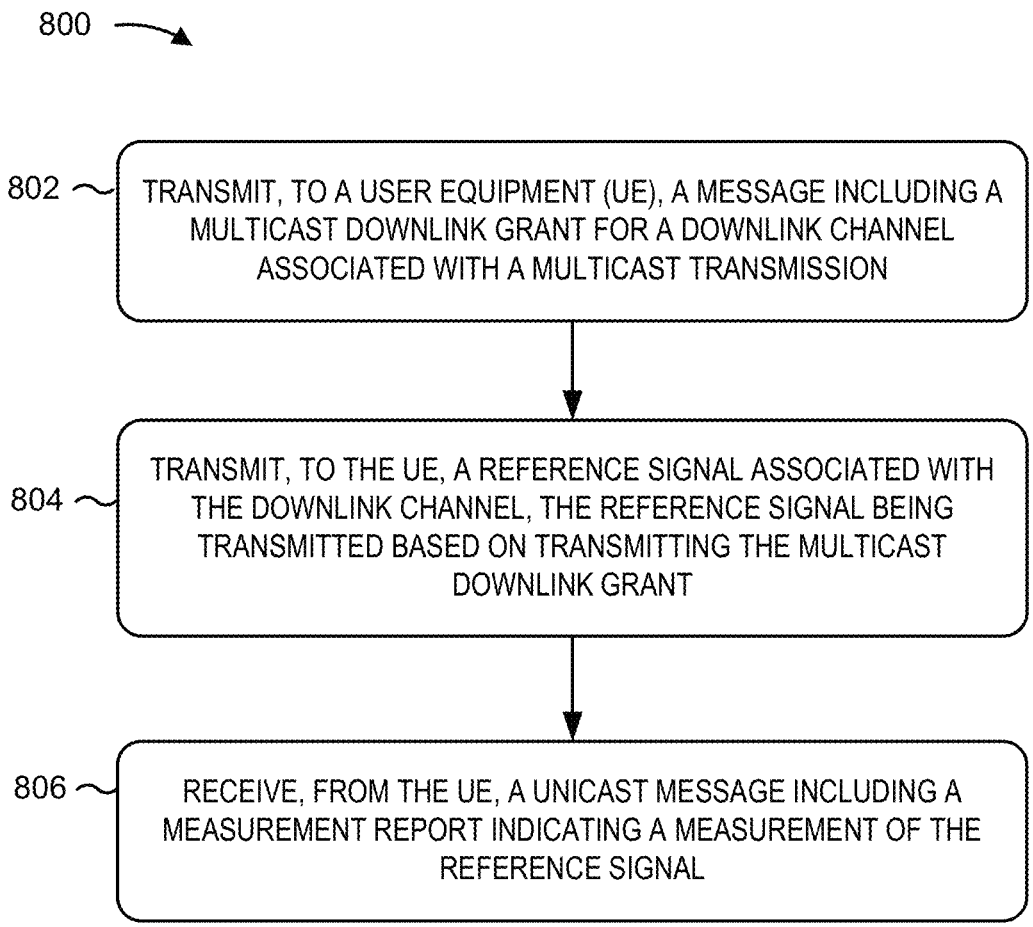
FIG. 8 is a flow diagram illustrating an example process performed at a base station that supports transmitting a downlink grant to initiate a channel measurement for a downlink channel associated with a multicast transmission, in accordance with various aspects of the present disclosure.

FIG. 8 is a flow diagram illustrating an example process performed at a base station that supports transmitting a downlink grant to initiate a channel measurement for a downlink channel associated with a multicast transmission, in accordance with various aspects of the present disclosure. The example process 800 is an example of re-transmitting a downlink grant to initiate a channel measurement for a downlink channel associated with a multicast transmission, in accordance with various aspects of the present disclosure. The operations of the process 800 may be implemented by a base station, such as a base station 110a, 110b, 110c, or 406, or its components, described with reference to FIGS. 1, 4A, and 4B. For example, operations of the process 800 may be performed by a communications manager 615 as described with reference to FIG. 6. In some examples, a base station may execute a set of instructions to control the functional elements of the base station to perform the operations or functions described below. Additionally, or alternatively, a base station may perform aspects of the operations or functions described below using special-purpose hardware.

In block 802, the base station transmits, to a UE, a message including a multicast downlink grant for a downlink channel associated with a multicast transmission. In some examples, the UE may be a member of a group of UEs and the message including the multicast downlink grant may be transmitted to one or more UEs in the group of UEs. In block 804, the base station transmits, to the UE, a reference signal associated with the downlink channel. The reference signal may be transmitted to the UE based on transmitting the multicast downlink grant. Additionally, in block 806, the base station receives, from the UE, a unicast message comprising a measurement report indicating a measurement of the reference signal.

The following provides an overview of some Aspects of the present disclosure:

Aspect 1. A method of wireless communication performed by a UE, comprising: receiving, from a base station, a message comprising a multicast downlink grant for a downlink channel associated with a multicast transmission; receiving, from the base station, a reference signal associated with the first downlink channel; and transmitting, to the base station, a unicast message comprising a measurement report indicating a measurement of the reference signal associated with the downlink channel, the reference signal being measured based on receiving the multicast downlink grant.

Aspect 2. The method of any one of Aspect 1, wherein the multicast downlink grant is DCI scrambled with a G-RNTI.

Aspect 3. The method of any one of Aspects 1-2, wherein the multicast downlink grant comprises a channel measurement field indicating the reference signal is an A-CSI-RS.

Aspect 4. The method of Aspect 3, wherein: the A-CSI-RS is associated with one or more A-CSI-RS resource sets; and the one or more A-CSI-RS resource sets being configured to the UE based on RRC signaling or based on an association with the multicast transmission.

Aspect 5. The method of Aspect 3, wherein: a time of the A-CSI-RS is offset in relation to a time of the multicast downlink grant based on a pre-defined time offset or a dynamic time offset; and the dynamic time offset is configured based on RRC signaling.

Aspect 6. The method of any one of Aspects 1-2, wherein: the multicast downlink grant comprises a channel measurement field indicating the reference signal is a periodic CSI-RS; and the method further comprises: receiving downlink control signaling indicating a configuration for measuring the periodic CSI-RS.

Aspect 7. The method of any one of Aspects 1-2, wherein the multicast downlink grant comprises a channel measurement field indicating the reference signal is a DMRS.

Aspect 8. The method of any one of Aspects 1-8, wherein: the multicast downlink grant comprises a measurement request field indicating an uplink control channel for transmitting the measurement report; and the unicast message is transmitted via the uplink control channel based on receiving the multicast downlink grant.

Aspect 9. The method of Aspect 8, wherein: the multicast downlink grant indicates resources for the uplink control channel; and the measurement comprises a CSI measurement.

Aspect 10. The method of Aspect 9, wherein the resources for the uplink control channel comprise: reserved periodic uplink control channel resources for CSI reporting; uplink control channel resources for unicast feedback; or dedicated uplink control resources.

Aspect 11. The method of any one of Aspects 1-10, further comprising: receiving, from the base station, an uplink grant; and transmitting the unicast message comprising the measurement report based on receiving the uplink grant, wherein the uplink grant comprises a measurement report field for triggering transmission of the measurement report or an implicit indication for triggering transmission of the measurement report.

Aspect 12. The method of Aspect 11, further comprising receiving, from the base station, RRC signaling indicating a plurality of candidate values for a time offset between a transmission time of the measurement report and a time of the uplink grant, wherein a candidate value field of the uplink grant indicates one of the plurality of candidate values.

Aspect 13. The method of Aspect 11, further comprising monitoring for the uplink grant during a time window, wherein: the time window is a pre-defined time window or a dynamic time window; and the dynamic time window is configured based on RRC signaling.

Aspect 14. A method of wireless communication performed by a base station, comprising: transmitting, to a UE, a message comprising a multicast downlink grant for a downlink channel associated with a multicast transmission; transmitting, to the UE, a reference signal associated with the downlink channel, the reference signal being transmitted based on transmitting the message comprising the multicast downlink grant; and receiving, from the UE, a unicast message comprising a measurement report indicating a measurement of the reference signal.

Aspect 15. The method of Aspect 14, wherein the downlink grant is DCI scrambled with a G-RNTI.

Aspect 16. The method of any one of Aspects 14-15, wherein: a channel measurement field of the multicast downlink grant indicates the reference signal is an A-CSI-RS; and the method further comprises: transmitting the A-CSI-RS based on transmitting the downlink grant.

Aspect 17. The method of any one of Aspects 14-15, wherein a channel measurement field of the multicast downlink grant indicates the reference signal is a periodic CSI-RS.

Aspect 18. The method of any one of Aspects 14-15, wherein the reference signal is a DMRS.

Aspect 19. The method of any one of Aspects 14-18, further comprising transmitting, to the UE, an uplink grant requesting the measurement report.

Aspect 20. The method of any one of Aspects 14-19, wherein the unicast message is received via an uplink control channel based on a measurement request field of the multicast downlink grant.

Aspect 21. The method of Aspect 20, further comprising transmitting an indication of resources for the uplink control channel via the multicast downlink grant, wherein the measurement report is an aperiodic channel state information (A-CSI) measurement report.

Aspect 23. The method of Aspect 21, wherein the resources for the uplink control channel comprise: reserved periodic uplink control channel resources for CSI reporting; uplink control channel resources for unicast feedback; or dedicated uplink control resources.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, from a network entity, a message transmitted to a multicast group of UEs that includes the UE, the message comprising a multicast downlink grant that schedules a multicast data transmission, via a downlink channel, for the multicast group of UEs;
   receiving, from the network entity via the downlink channel, a multicast reference signal in accordance with receiving the message comprising the multicast downlink grant; and
   transmitting, to the network entity via an uplink channel, a unicast message comprising a measurement report indicating a measurement of the multicast reference signal, the multicast reference signal being measured in association with receiving the multicast downlink grant.

2. The method of claim 1, wherein the multicast downlink grant is downlink control information (DCI) scrambled with a group-radio network temporary identifier (G-RNTI).

3. The method of claim 1, wherein the multicast downlink grant comprises a channel measurement field indicating the multicast reference signal is an aperiodic channel state information (CSI) reference signal (RS) (A-CSI-RS).

4. The method of claim 3, wherein:
   the A-CSI-RS is associated with one or more A-CSI-RS resource sets; and
   the one or more A-CSI-RS resource sets are configured to the UE based on radio resource control (RRC) signaling or based on an association with the multicast transmission.

5. The method of claim 3, wherein:
   a time of the A-CSI-RS is offset in relation to a time of the multicast downlink grant based on a pre-defined time offset or a dynamic time offset; and
   the dynamic time offset is configured based on radio resource control (RRC) signaling.

6. The method of claim 1, further comprising:
   receiving, from the network entity, an uplink grant; and
   transmitting the unicast message comprising the measurement report in association with receiving the uplink grant, wherein the uplink grant comprises a measurement report field for triggering transmission of the measurement report or an implicit indication for triggering transmission of the measurement report.

7. The method of claim 6, further comprising receiving, from the network entity, radio resource control (RRC) signaling indicating a plurality of candidate values for a time offset between a transmission time of the measurement report and a time of the uplink grant, wherein a candidate value field of the uplink grant indicates one of the plurality of candidate values.

8. The method of claim 6, further comprising monitoring for the uplink grant during a time window, wherein:
   the time window is a pre-defined time window or a dynamic time window; and
   the dynamic time window is configured based on radio resource control (RRC) signaling.

9. The method of claim 1, wherein:
   the multicast downlink grant comprises a channel measurement field indicating the multicast reference signal is a periodic channel state information (CSI) reference signal (RS) (CSI-RS); and
   the method further comprises receiving downlink control signaling indicating a configuration for measuring the periodic CSI-RS.

10. The method of claim 1, wherein the multicast downlink grant comprises a channel measurement field indicating the multicast reference signal is a demodulation reference signal (DMRS).

11. The method of claim 1, wherein:
   the multicast downlink grant comprises a measurement request field indicating the uplink channel for transmitting the measurement report; and the unicast message is transmitted via the uplink channel in association with receiving the multicast downlink grant.

12. The method of claim 11, wherein:
the uplink channel is an uplink control channel;
the multicast downlink grant indicates resources for the uplink control channel; and
the measurement comprises a channel state information (CSI) measurement.

13. The method of claim 12, wherein the resources for the uplink control channel comprise:
reserved periodic uplink control channel resources for CSI reporting;
uplink control channel resources for unicast feedback; or
dedicated uplink control resources.

14. A user equipment (UE), comprising:
one or more processors; and
one or more memories coupled with the one or more processors and storing processor-executable code that, when executed by the one or more processors, is configured to cause the UE to:
receive, from a network entity, a message transmitted to a multicast group of UEs that includes the UE, the message comprising a multicast downlink grant that schedules a multicast data transmission, via a downlink channel, for the multicast group of UEs;
receive, from the network from the network entity via the downlink channel, a multicast reference signal in accordance with receiving the message comprising the multicast downlink grant; and
transmit, to the network entity via an uplink channel, a unicast message comprising a measurement report indicating a measurement of the multicast reference signal, the multicast reference signal being measured in association with receiving the multicast downlink grant.

15. The UE of claim 14, wherein the multicast downlink grant comprises a channel measurement field indicating the multicast reference signal is an aperiodic channel state information (CSI) reference signal (RS) (A-CSI-RS).

16. The UE of claim 15, wherein:
the A-CSI-RS is associated with one or more A-CSI-RS resource sets; and
the one or more A-CSI-RS resource sets are configured to the UE based on radio resource control (RRC) signaling or based on an association with the multicast transmission.

17. A method of wireless communication performed by a network entity, comprising:
transmitting, to a multicast group of user equipment (UEs), a message comprising a multicast downlink grant that schedules a multicast data transmission, via a downlink channel, for the multicast group of UEs;
transmitting, to the multicast group of UEs via the downlink channel, a multicast reference signal in accordance with transmitting the message comprising the multicast downlink grant; and
receiving, from a UE of the multicast group of UEs via an uplink channel, a unicast message comprising a measurement report indicating a measurement of the multicast reference signal.

18. The method of claim 17, wherein the multicast downlink grant is downlink control information (DCI) scrambled with a group-radio network temporary identifier (G-RNTI).

19. The method of claim 17, wherein:
a channel measurement field of the multicast downlink grant indicates the multicast reference signal is an aperiodic channel state information (CSI) reference signal (RS) (A-CSI-RS); and
the method further comprises transmitting the A-CSI-RS in association with transmitting the multicast downlink grant.

20. The method of claim 17, further comprising transmitting, to the UE, an uplink grant requesting the measurement report.

21. The method of claim 17, wherein:
the uplink channel is an uplink control channel; and
the unicast message is received via the uplink control channel in association with a measurement request field of the multicast downlink grant.

22. The method of claim 21, further comprising transmitting an indication of resources for the uplink control channel via the multicast downlink grant, wherein the measurement report is an aperiodic channel state information (A-CSI) measurement report.

23. The method of claim 22, wherein the resources for the uplink control channel comprise:
reserved periodic uplink control channel resources for CSI reporting;
uplink control channel resources for unicast feedback; or
dedicated uplink control resources.

24. The method of claim 17, wherein a channel measurement field of the multicast downlink grant indicates the multicast reference signal is a periodic channel state information (CSI) reference signal (RS) (CSI-RS).

25. The method of claim 17, wherein the multicast reference signal is a demodulation reference signal (DMRS).

26. A network entity, comprising:
one or more processors; and
one or more memories coupled with the one or more processors and storing processor-executable code that, when executed by the one or more processors, is configured to cause the network entity to:
transmit, to a multicast group of user equipment (UEs), a message comprising a multicast downlink grant that schedules a multicast data transmission, via a downlink channel, for the multicast group of UEs;
transmit, to the multicast group of UEs via the downlink channel, a multicast reference signal in accordance with transmitting the message comprising the multicast downlink grant; and
receive, from a UE of the multicast group of UEs via an uplink channel, a unicast message comprising a measurement report indicating a measurement of the multicast reference signal.

27. The network entity of claim 26, wherein:
the multicast downlink grant comprises a channel measurement field indicating the multicast reference signal is an aperiodic channel state information (CSI) reference signal (RS) (A-CSI-RS); and
execution of the instructions further cause the apparatus to transmit the A-CSI-RS in association with transmitting the multicast downlink grant.

28. The network entity of claim 26, wherein execution of the instructions further cause the apparatus to transmit, to the UE, an uplink grant requesting the measurement report.

29. The network entity of claim 26, wherein:
the uplink channel is an uplink control channel; and
the unicast message is received via the uplink control channel in association with a measurement request field of the multicast downlink grant.

30. The network entity of claim 29, further comprising transmitting an indication of resources for the uplink control channel via the multicast downlink grant, wherein the measurement report is an aperiodic channel state information (A-CSI) measurement report.

\* \* \* \* \*